Aug. 9, 1932.   H. W. BELL   1,871,025
VEHICLE SUSPENSION MEANS
Filed May 28, 1930   2 Sheets-Sheet 1
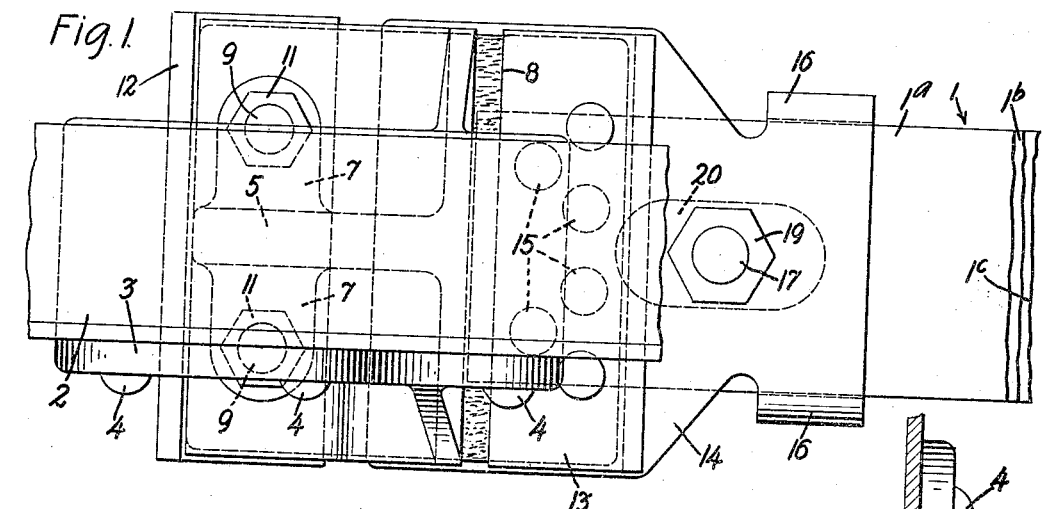
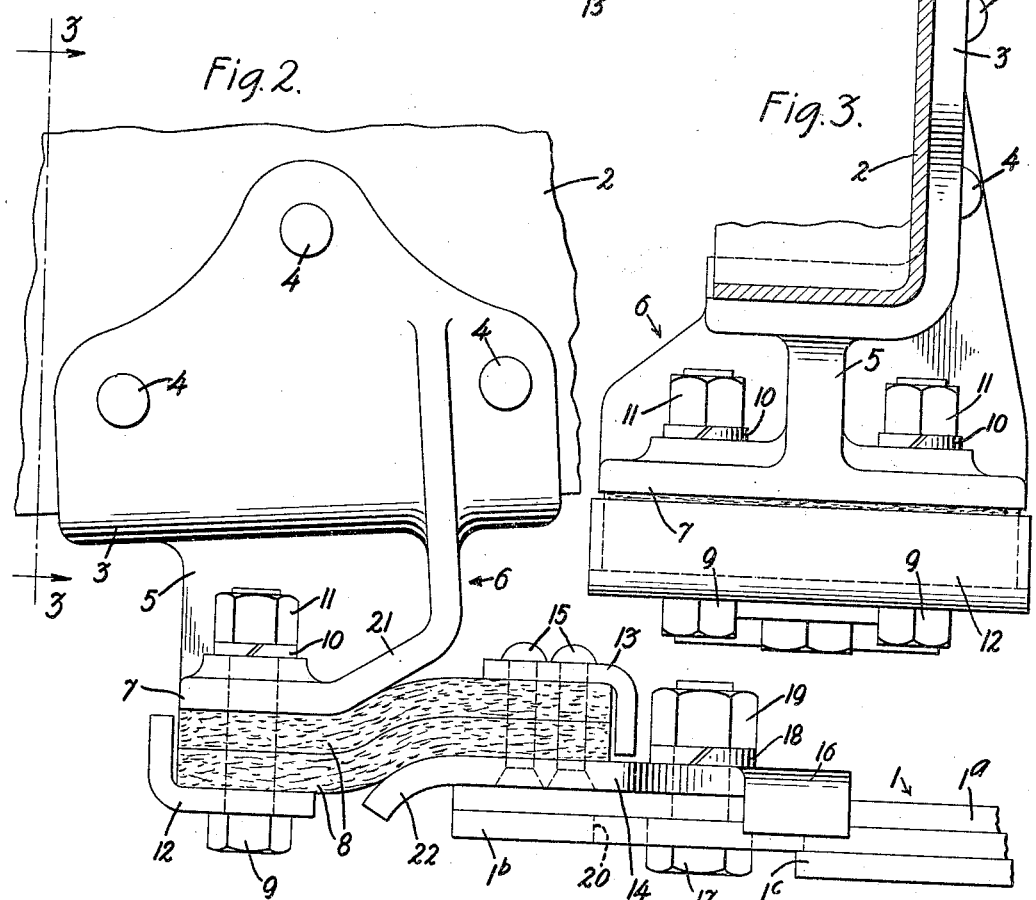
INVENTOR
Harvey W. Bell.
BY Moses & Nolte
ATTORNEYS

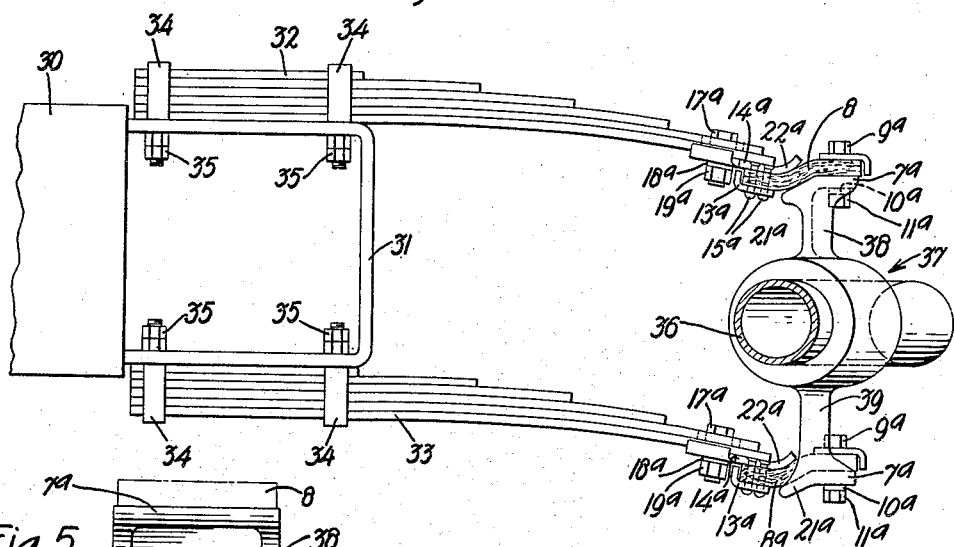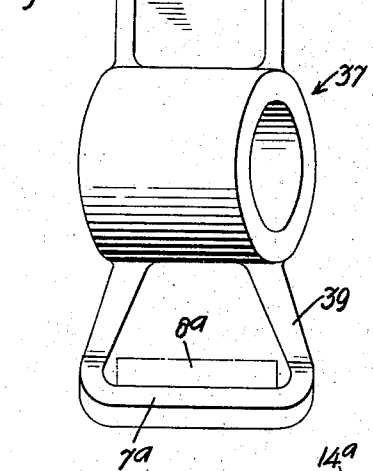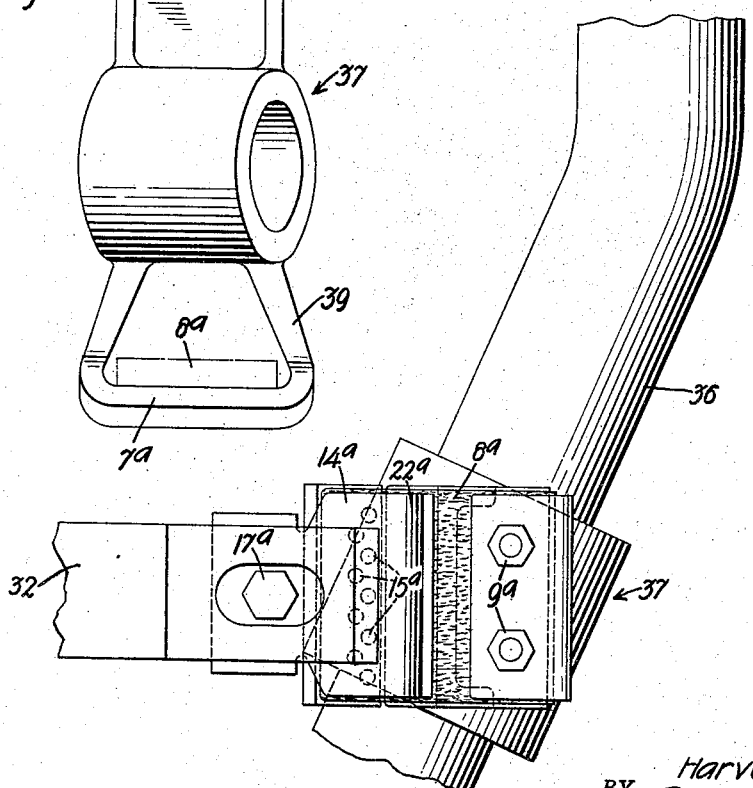

Patented Aug. 9, 1932

1,871,025

UNITED STATES PATENT OFFICE

HARVEY W. BELL, OF ARDSLEY-ON-HUDSON, NEW YORK, ASSIGNOR TO THE BELOYT CORPORATION, OF NEW YORK, N. Y., A CORPORATION OF DELAWARE

VEHICLE SUSPENSION MEANS

Application filed May 28, 1930. Serial No. 456,360.

This invention relates to vehicle shackles, and has for an object to improve shackles of the type employing links or plates of flexible, non-metallic material.

It is an object of the invention to eliminate relative fore and aft movement of the body and the connected spring end. It is a further object to provide a shackle having greater strength than similar shackles heretofore employed. To these ends the flexible, non-metallic plate is mounted to sustain the load in compression, but is so arranged that it is maintained always under tension from end to end, the pull being exerted directly in line with the warp fibers, and being distributed throughout the width of the flexible plate.

It is an object of the invention to provide a shackle of the above referred to type which will be free from objectionable localized wear, and which will, therefore, be long-lived.

It is a further object of the invention to provide a shackle construction of the type referred to, which will be extremely compact when installed.

It is a further object of the invention to provide a shackle of the type referred to which involves only small and simple parts, cheap to manufacture and to assemble, and few in number, so that the shackle organization may be made economically.

Other objects and advantages will hereinafter appear.

In the drawings forming part of this specification:

Figure 1 is a fragmentary, plan view of the body and spring of a motor vehicle connected by a shackle embodying features of the invention;

Figure 2 is a fragmentary, side elevation of the structure shown in Figure 1;

Figure 3 is a fragmentary, sectional end elevation, the section being taken on the line 3—3 of Figure 2, looking in the direction of the arrows;

Figure 4 is a fragmentary, sectional side elevation showing the invention applied to a duplex spring construction of a front drive motor vehicle;

Figure 5 is a detail view showing a shackle supporting bracket employed in the construction of Figure 4; and Figure 6 is a fragmentary, plan view of the structure of Figure 4.

The drawings show an end of a laminated spring 1 composed of a main leaf $1^a$ and auxiliary leaves $1^b$ and $1^c$. This spring is connected to a channel member 2 of the vehicle body and supports the vehicle body. Such support is effected through the novel shackle embodying features of the present invention.

A bracket 3 is secured to the channel member 2 by rivets 4 or other suitable means, and includes a downwardly extending web 5 and an angular plate 6 which terminates in a horizontally extending clamping portion 7. Flexible, non-metallic, substantially inelastic links 8 of suitable material, such as rubberized fabric, form a flexible plate and are clamped against the lower horizontal surface of the clamping portion 7 by means of bolts 9, lock washers 10, and nuts 11. A pressure distributing clamping plate 12 is interposed between the heads of the bolts 9 and the lower face of the lower link 8 and serves to distribute the clamping pressure throughout substantially the entire area of the left hand end of such link. The other ends of the flexible links 8 are interposed between an upper clamping plate 13 and a lower clamping plate 14 and are permanently secured to said clamping plates by rivets 15 or other suitable fastening means.

The clamping plate 14 rests upon the rear end of the master leaf $1^a$ of the spring 1 and is provided with downturned ears 16 which embrace the spring. The clamping plate 14 is secured to the spring by means of a bolt 17, a lock washer 18, and a nut 19. The ears 16 hold the plate 14 against rotation, and hence make practicable the securement of the clamping plate to the spring by a single bolt and nut assembly. The head of the bolt 17 plays in an elongated recess 20 in the auxiliary leaf $1^b$, and does not, therefore, interfere with relative longitudinal movement of the main and auxiliary spring leaves.

The opposite ends of the flexible links 8 are disposed in substantially horizontal planes, but not in a common plane, the body connected ends of the links being situated at a lower level than the spring connected ends thereof. As a result of this arrangement the intermediate portion of the flexible plates is inclined upward from the point of its connection to the body toward the point of its connection to the spring.

The plate member 6 of bracket 3 includes a load bearing portion 21 having a substantially flat lower surface in engagement with the intermediate portion of the plate formed by the links 8. The left end of the clamping plate 14 is extended beyond the end of the spring 1 and bears against the lower side of the plate formed by the links 8 in opposed relation to the flat surface of the bearing portion 21 of bracket 3. The bearing portion 22 of plate 14 is not flat, however, but is curved about a large radius, the curvature being so slight that the pressure against the flexible plate is never localized, but is always distributed over a considerable area. The curved surface, moreover, is so extensive and of such slight curvature that the center of load is adapted to shift through a considerable space lengthwise of the flexible links under varying conditions of operation. Severe localized wear on the fabric is, therefore, avoided.

In the described construction the substantially flat bearing surface is fixed on the frame, and the curved bearing surface is fixed on the spring. This feature is one of very great importance, since it has been found that the flat surface must have substantially a predetermined angularity with reference to the horizontal, so that the strain exerted on it by the spring end will be directly normal to the surface under maximum thrust conditions. For the front end of a rear spring this angle has been found to be approximately thirty degrees from the horizontal, regardless of the weight or make of car or camber of the spring. Similarly for the front end of the front spring the angle has been found to be about twenty degrees. If, however, the described shackle is employed at the rear end of the front spring instead of at the front end thereof, then this angle should be about thirty degrees, instead of about twenty degrees, because the drag of the front axle is then taken in compression on the pivot and braking strains are also taken in compression. It is apparent, therefore, that it is of great advantage to so mount the inclined bearing surface that its angle to the horizontal will not change substantially under varying driving conditions. Obviously the inclined bearing surface will maintain a far more uniform inclination if mounted on the body than it would if mounted on the spring end.

It would be possible to mount the inclined surface on the spring end and the rounded surface on the body, but in that case the angularity of the inclined surface to the spring end would have to be determined for every different spring camber and load, that is, for each different vehicle or make of car a different design would have to be contrived. With the arrangement disclosed in the drawings, however, such calculation is unnecessary.

It has been stated above that the force exerted by the spring end should be normal to the inclined bearing surface under conditions of maximum thrust. This is true for the reason that when the thrust is normal to such inclined surface the only compression strain on the fabric is transverse to the fabric, so that there is no tendency to slide.

It is also an important feature of the present construction that although the intermediate bearing portion of the flexible plate is inclined, the end portions thereof are disposed horizontally. This effects an important economy in the saving of space and in the size of the bracket used to attach the fabric end to the spring. With the present arrangement the clamping brackets 12, 13 and 14 are all of very simple construction and may be readily stamped in quantity production.

In Figures 4 to 6 the invention is shown as applied to the spring suspension of a front drive automobile employing duplex springs carried by the vehicle body.

The vehicle body 30 is provided with a channel member 31 to which upper and lower laminated quarter-elliptic springs 32 and 33 are rigidly secured by suitable U-bolts 34 and nuts 35. The front axle 36, which is supported by the front wheels, not shown, has fast thereon a sleeve member 37 which includes upper and lower bracket arms 38 and 39. A shackle similar to that described in connection with Figures 1 to 3 is interposed between each of the bracket arms and the associated spring end. The bracket arm 38 includes a clamping portion 7a and a straight inclined bearing portion 21a. A flexible link 8a is clamped to the clamping portion 7a by means of bolts 9a, lock washers 10a and nuts 11a. The opposite end of the flexible plate 8a is secured by rivets 15a and a clamping plate 13a to a connector and bearing plate 14a which includes a curved end portion 22a for cooperating through the plate 8a with the bearing portion 21a of the bracket 38. The clamping plate 14a is similar to the clamping plate 14 already described, and is secured to the spring 32 by a bolt 17a, lock washer 18a and nut 19a. The lower end of the arm 39 is connected with the spring 33 by identical connecting means. A detailed description thereof is therefore thought to be unnecessary, and corresponding reference numerals have therefore been applied to the corresponding parts.

It will be observed that the springs 32 and 33 are parallel, and that they are connected to the axle 36 through the sleeve and bracket member 37 at substantially diametrically opposite points. The flexure of the springs, therefore, has substantially no tendency to turn the axle 36, and hence the bracket members 38 and 39 occupy substantially uniform angular positions under all operating conditions. Accordingly it is preferable to provide the straight inclined bearing surfaces upon the brackets 38 and 39 and the curved bearing surfaces upon the spring carried members, since by this arrangement the inclined bearing surfaces are so mounted that their angles to the horizontal will not change substantially under varying driving conditions. As in the form of the invention disclosed in Figures 1 to 3, inclusive, the arrangement is such that the force exerted upon the inclined bearing surfaces by the spring ends is substantially normal to such surfaces under maximum thrust conditions.

I have described what I believe to be the preferred embodiments of my invention. I do not wish, however, to be confined to the embodiments shown, but what I desire to cover by Letters Patent is set forth in the appended claims.

I claim:

1. In combination, a supporting member, a supported member, a flexible plate, means attaching opposite ends of the flexible plate to said members in offset relation and with said ends extending in substantially parallel planes, a load bearing member carried by the supporting member and having a curved surface of slight curvature engaging an intermediate portion of the flexible plate, and a load bearing member carried by the supported member and having a substantially flat bearing surface extending obliquely to said parallel planes and engaging said intermediate portion of the flexible plate in opposed relation to the first-mentioned load bearing member.

2. In a motor vehicle, in combination, a body member, a supporting spring member therefor, a flexible plate connected at opposite ends to said members and extending at an inclination between them, a flat inclined load-bearing member carried by the body member and engaging the upper surface of the flexible plate, and a rounded load bearing member of slight curvature carried by the spring member and always engaging the lower surface of the flexible plate in opposed relation to said inclined, load-bearing member.

3. In a motor vehicle, in combination, a body member, a supporting spring member therefor, a flexible plate having the opposite ends thereof disposed in offset substantially parallel planes and attached to the respective members, and bearing members carried by the body and spring members and engaging the upper and lower faces of the plate between the attached portions, one of said bearing members having a bearing surface of slight curvature always in engagement with the flexible plate, and the other being substantially flat and always operatively opposed to said bearing surface of slight curvature.

4. In a motor vehicle, in combination, a body member, a supporting spring member therefor, a flexible plate having the opposite ends thereof disposed in offset substantially parallel planes and attached to the respective members, and bearing members carried by the body and spring members and engaging the upper and lower faces of the plate between the attached portions, the body carried bearing member being disposed at an inclination and being substantially flat, and the spring carried bearing member having a bearing surface of slight curvature adapted to coact under all load conditions with said inclined bearing member.

5. In a motor vehicle, in combination, a body member, a supporting spring member therefor, a flexible plate connected at opposite ends to said members and extending at an inclination between them, a flat load bearing member carried by the body member and having an inclined portion engaging the upper surface of the flexible plate, and a rounded load bearing member of slight curvature carried by the spring member and engaging the lower surface of the flexible plate, the load bearing members being so related that the pressure will be normal to the flat surface when the maximum thrust occurs, and the load will be transmitted invariably through the inclined and rounded surfaces of said members.

6. In a motor vehicle, in combination, a body member, a supporting spring member therefor, a flexible plate having the opposite ends thereof disposed in offset substantially parallel planes and attached to the respective members, and bearing members carried by the body and spring members and engaging the upper and lower faces of the plate between the attached portions, the body carried bearing member being disposed at an inclination of about thirty degrees and being substantially flat, and the spring carried bearing member having a bearing surface of slight curvature adapted normally to coact with the inclined bearing member.

7. In a motor vehicle, in combination, a vehicle body, an axle, a pair of springs carried by the body above and below the axle, and means pivotally connecting the springs with the axle comprising flexible plates, each plate being rigidly connected at the opposite ends thereof to the axle and to one of the springs, and cooperative bearing members carried by each spring and by the axle, respectively, and engaging opposed faces of an intermediate portion of the associated flexible plate, the spring carried bearing members being curved upon large radii and adapted always to support the load upon the curved surfaces, and the axle carried bearing members being straight and inclined.

In testimony whereof I have affixed my signature to this specification.

HARVEY W. BELL.